United States Patent [19]

Walden et al.

[11] Patent Number: 4,631,956

[45] Date of Patent: Dec. 30, 1986

[54] AIR DEPLOYED OCEANOGRAPHIC MOORING

[75] Inventors: Robert G. Walden, East Falmouth; Henri O. Berteaux, Falmouth, both of Mass.; Leslie W. Bonde, Potomac; David B. Dillon, Derwood, both of Md.; Eric J. Softley, Key Biscayne, Fla.; Thomas M. Popp, Langhorne; Edgar A. Reed, 3rd, Ambler, both of Pa.

[73] Assignee: The United States of America as represented by the Secretary of the Navy, Washington, D.C.

[21] Appl. No.: 645,129

[22] Filed: Aug. 27, 1984

[51] Int. Cl.⁴ ............................................. B63B 22/00
[52] U.S. Cl. .................................... 73/170 A; 441/25; 441/33
[58] Field of Search ................. 73/170 A; 441/33, 25, 441/3

[56] References Cited

U.S. PATENT DOCUMENTS

| | | | |
|---|---|---|---|
| 2,978,690 | 4/1961 | Kurie | 73/170 A |
| 3,436,775 | 4/1969 | Schlosser | 441/33 |
| 3,965,512 | 6/1976 | Bennett | 441/25 |
| 3,998,408 | 12/1976 | Caldwell | 441/3 |
| 4,096,598 | 6/1978 | Mason | 441/25 |
| 4,161,716 | 7/1979 | Stixrud | 441/33 |
| 4,209,151 | 6/1980 | Saunders | 441/33 |
| 4,246,671 | 1/1981 | Swenson | 441/25 |
| 4,430,552 | 2/1984 | Peterson | 441/33 |

FOREIGN PATENT DOCUMENTS 962029  2/1975  Canada .......................... 73/170 A

OTHER PUBLICATIONS

Current Measurement System; by Edgerton; 25A-1-7; Conference MTS-IEEE; 13-15 Sep. 1976.

Primary Examiner—Charles Frankfort
Assistant Examiner—Denis E. Corr
Attorney, Agent, or Firm—Arthur A. McGill; Prithvi C. Lall; Michael J. McGowan

[57] ABSTRACT

An Air Deployed Oceanographic Mooring when assembled for deployment has a multitude of components suitable for separation by explosive bolts upon deployment of the system. A parachute system is connected to a surface buoy. The components that separate from each other upon deployment comprise a parachute system, a surface float, a subsurface buoy, an anchor shell and a bottom finder. All components except for the parachute system have interconnecting flexible lines upon deployment. A novel locking mechanism for limiting the paying out of the line between the anchor shell and subsurface buoy is triggered by the slackening of the line between the bottom finder and anchor shell when the bottom finder hits the bottom of the ocean.

5 Claims, 4 Drawing Figures

AIR DEPLOYED OCEANOGRAPHIC MOORING

STATEMENT OF GOVERNMENT INTEREST

The invention described herein may be manufactured and used by or for the Government of the United States of America for governmental purposes without the payment of any royalties thereon or therefor.

This patent application is co-pending with related patent application entitled "Mooring Line Lockup Mechanism" by Robert G. Walden filed on the same date as this patent application.

BACKGROUND OF THE INVENTION (1) Field of the Invention

The present invention relates to an air deployed deep sea mooring which could make oceanographic measurements, then telemeter this data via satellite to a shore station. Desired measurements were from the upper 1500 m (4900 ft.) of the water column. This would be in deep ocean location except the major current systems and deep trenches. Some of the parameters to be measured include pressure, temperature, conductivity, current speed and direction. State-of-the-art sensors were available for measuring pressure and temperature, and could be incorporated into the design. The advantages of using long range aircraft were to be exploited in the delivery of moored instrument platforms. One of the expected benefits from this approach included lower final data cost, in comparison to the costs of operating oceanographic research vessels. The speed advantages of aircraft over surface vessels provide scientists with the ability to obtain synoptic data. Their quick-response capability allows data from rapidly developing phenomena to be obtained in a timely manner. Finally, long range aircraft can access remote areas of the oceans, (particularly the Arctic, Antarctic, and southern oceans) which are inaccessible to surface vessels. Further information is provided in a paper presented and published at the MTS Conference "Oceans '83", San Francisco, Calif., Aug. 29, 1983. Woods Hole Oceanographic Institute Contribution No. 5457.

(2) Description of the Prior Art

Within the past decade, progress in oceanographic instruments, electronics, satellite communications, and moorings has enabled the design of reliable, light weight, moored instrument platforms. The objectives of this invention could be met by a mooring system, deliverable to an intended mooring location by long range aircraft, then parachuted to the ocean surface to automatically deploy and anchor. A processing and storage unit, with a surface buoy containing a telemetry transmitter for satellite communication would complete the system.

A prior art deployment system of Caldwell, Jr. et al is described in U.S. Pat. No. 3,998,408. Upon deployment from an aircraft it has a parafoil containing a payload remaining in tether flight, a sea anchor affixing to the earth beneath the water and a main shell at water surface connecting to both the parafoil and sea anchor.

SUMMARY OF THE INVENTION

In response to the need for low cost, rapidly deployed, deep ocean, instrumented data platforms a program was sponsored by the Office of Naval Research to develop an Air Deployed Oceanographic Mooring (ADOM). This mooring comprises of a subsurface buoy, taut moored by a cable with in-line sensors, and contains a computer for data acquisition and processing. A surface float housing a satellite transmitter and antenna is tethered to the subsurface buoy by a compliant data line. The design evolved from a feasibility study, theoretical analyses, and testing in the laboratory, dockside, and at sea.

A novel mooring line lockup mechansim is included in the system and has a spring operated trigger with a safety latch. The trigger is armed upon the mooring line paying out to a predetermined length. The trigger is actuated upon a bottom finder striking the bottom of the ocean. The actuation of the trigger prevents any more paying out of the mooring line thereby fixing the depth of the subsurface buoy.

ADOM is bolted together for launch as a single cylinder with a parachute deploying from one end. A one-year active life is attained by using low power "CMOS" for the processor, memory and sensor circuits.

Tests included a series of system deployments at sea. Temperature data were acquired by ADOM and telemetered to the shore station via the USAF LES-9 satellite according to a preset schedule. The test program concluded with two air drops from a U.S. Marine Corps C-130 aircraft. This demonstrated that the ADOM is a practical system for ocean data acquisition.

DESCRIPTION OF THE PREFERRED EMBODIMENT

Figure 1:
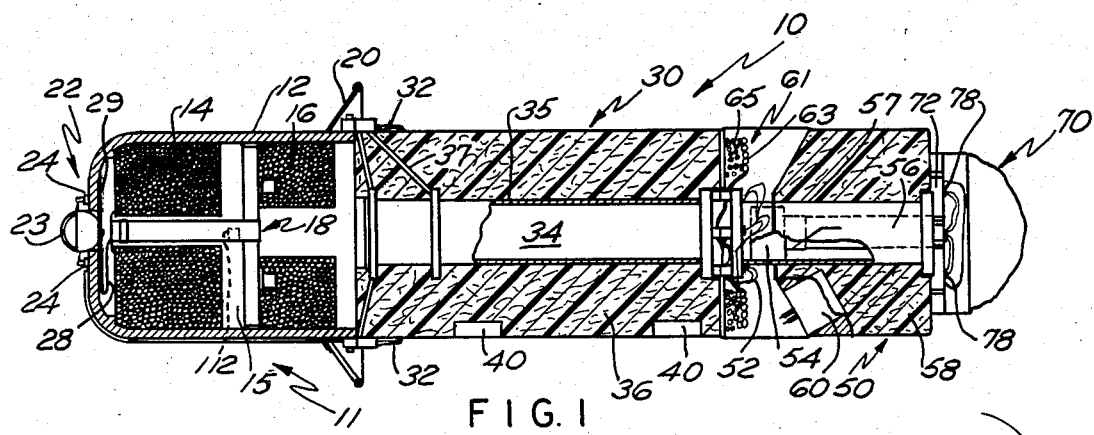
FIG. 1 shows a cutaway view of the Air Deployed Oceanographic Mooring prior to launch.

Referring now to FIG. 1 there is shown a cutaway view of an Air Deployment Oceanographic Mooring 10 that is assembled for deployment. The anchor 11 is the bottom section of ADOM 10 and the anchor 11 comprises an anchor shell 12 enclosing a mooring line 14 that can be made of aramid fibers, a sensor array 16 that forms an extension to mooring line 14, a mooring lockup mechanism 18, a stabilization fin 20 and a bottom finder assembly 22 that includes a small weight 23 connected to the anchor shell 12 with two explosive bolts 24. The small weight 23 is attached to mooring line lockup mechanism 18 by means of bottom finder line 28 on reel 29. An empty space 15 is left next to a portion of lockup mechanism 18. A subsurface buoy 30 is the middle section of ADOM 10 and is connected to the anchor 11 by means of explosive bolts 32. The subsurface buoy has a microprocessor 34 enclosed in pressure housing 35 and surrounded in the radial direction by syntactic foam 36 to provide flotation. Two detonator packs 40 are recessed in the syntactic foam 36. A pair of braces 37 help provide support.

A surface float 50 comprises the top section and is connected to the subsurface buoy 30 by means of explosive bolts 52. The surface float 50 has a telemetry transmitter 54 with ejectable antenna 56 enclosed by pressure housing 57 and surrounded in the radial direction by syntactic foam 58 to provide flotation. Embedded in the syntactic foam 58 is a transmitter battery pack 60. A tether 61 comprising a length of compliant rubber 63 and a parallel electromechanical (EM) cable 65 wrapped around the compliant rubber 63. The tether 61 is used to connect surface float 50 to subsurface buoy 30 when deployed. The compliant rubber 63 when unstretched is one third the length of the EM cable 65.

A PCU-8/A parachute system 70 is fastened to a cross-member 72 on top of the ADOM 10. The cross-member 72 is then attached to the surface float 50 with two explosive bolts 78 activated by water entry. The firing of bolts 78 jettisons the parachute system 70. The PCU-8/A parachute system 70 has its parachutes deployed in sequence in a known manner using static lines and explosive cutters.

The ADOM aeromechanical requirements were that the ADOM buoy 10 be compatible with the P-3 aircraft for carriage and launch; that the air descent is to be slowed and stabilized prior to water impact; and that all air descent system components separate after water impact. The device 10 could be stored beneath the aircraft wings or in the bomb bay. Dimensions were limited to 330 cm (130 in.) in length, 71 cm (28 in.) in diameter, and 1100 kg (2450 lb) maximum weight.

Figure 2:
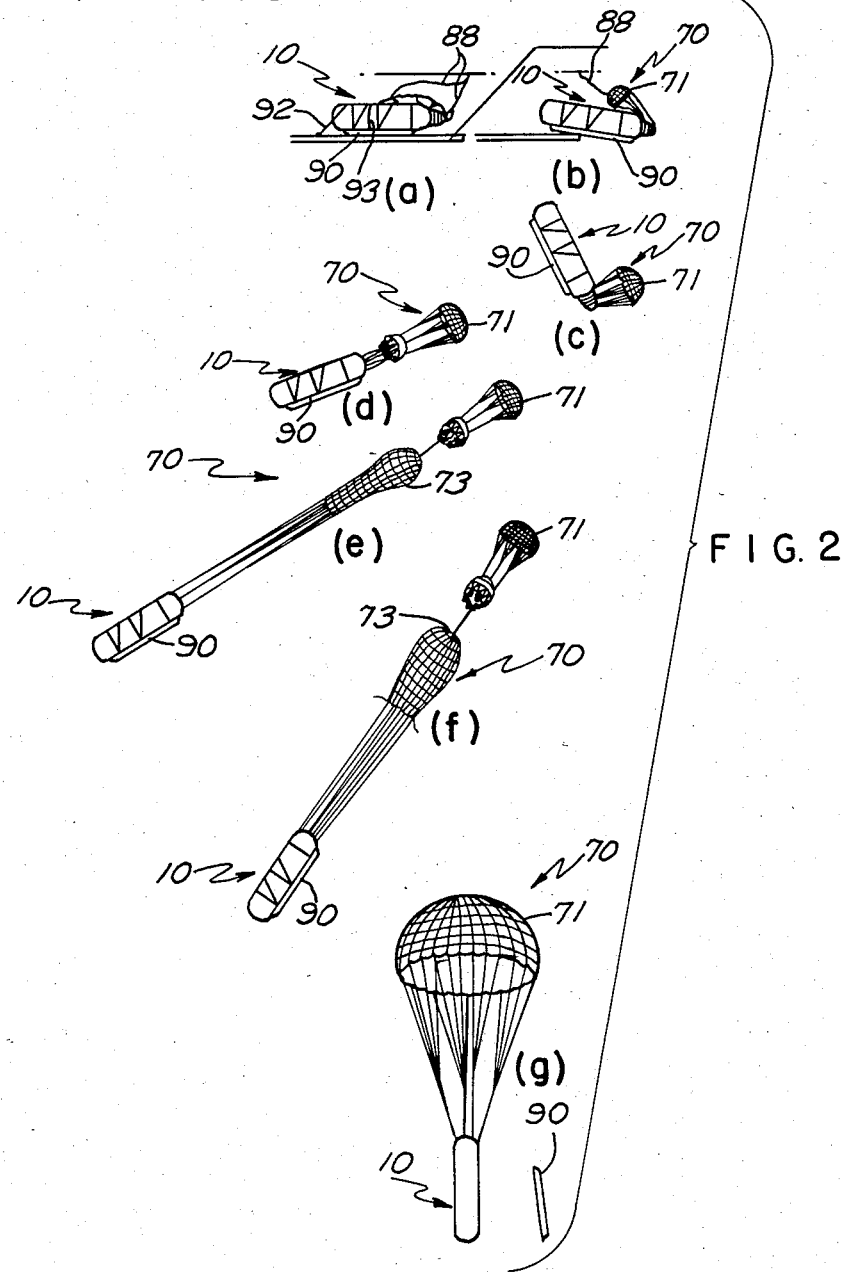
FIGS. 2a–g show several states of the parachute phase of the ADOM deployment from an aircraft.

FIGS. 2a-g show several states of the ADOM 10 deployment from a C-130 aircraft. This deployment is typical for a PCU-8/A parachute system and is well known in the art. In FIGS. 2a-g, ADOM 10 inside the C-130, is tied down for transport with the aircraft static lines 88 attached. The buoy is strapped in a parachute-first/anchor-last position, on a reinforced wood pallet 90 resting on the C-130 cargo rollers (not shown) in FIG. 2a. Shortly before launch, the heavy restraints 92 are removed and ADOM is restrained by a single quick-release strap 93. When the strap 93 is released, ADOM 10 rolls out of the aircraft as the plane climbs. In FIG. 2b the static line 88 attached to the aircraft releases the pilot parachute 71 of parachute system 70. The buoy 10 descends under the pilot parachute 71 as shown in FIG. 2c. In FIG. 2d the main parachute 73 releases. The pilot parachute 71 pulls the main parachute 73 from the deployment bag while simultaneously arming cutters (not shown) for detaching pallet 90. The mouth of the main parachute is first constricted as shown in FIG. 2e. After two seconds, two explosive reefing line cutters (not shown) allow the main canopy to open fully as shown in FIGS. 2f and 2g. Approximately three seconds later, the pallet 90 is released and falls away from the buoy 10. Upon water impact, explosive bolts fire releasing the parachute system 70 from the ADOM buoy 10.

After parachute delivery to the sea surface, the ADOM 10 package should deploy itself as a deep sea mooring. A two-stage mooring was selected to minimize the forces imparted to the mooring from ocean waves. In the absence of current, the main mooring flotation will be about 100 m (330 ft.) below the surface. The surface float 50 containing the telemetry transmitter 54 is designed to be small and light, minimizing wave forces on the buoy. To further reduce the action of these forces on the subsurface buoy 30, the tether cable 61 has a large scope and contains the compliant element 63 along with EM cable 65.

The deployment is shown in FIGS. 3a-i. After the parachute 70 is jettisoned, the anchor portion 11 separates from the attached buoy 30 and float 50 combination and descends to the bottom, paying out a sensor string 16 followed by the mooring line 14. When the anchor 11 separates, a small weight 23 is released and falls ahead of the anchor shell 12, pulling out a 100 m (330 ft) line bottom finder line 28. The mooring line 14 deploys freely as long as tension remains in this bottom finder line 28. When the weight 23 contacts bottom, 100 m below the anchor shell 12, release of tension in the bottom finder line 28 clamps the mooring line 14, preventing further payout. The surface float 50 and subsurface buoy 30 are pulled down about 100 m as the anchor 11 completes its descent, providing a taut mooring. The surface telemetry buoy 50 is finally released by time controlled explosive bolts 52 and comes to the surface.

Figure 4:
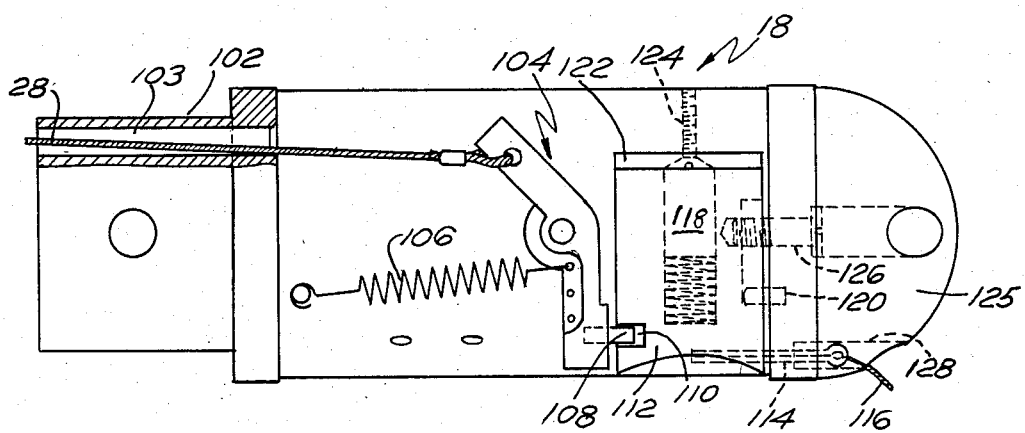
FIG. 4 is an expanded cutaway view of the lockup mechanism of FIG. 1.

Referring now to FIG. 4 there is shown the mooring line lockup mechanism 18. A spindle 102 having a hollow 103 has bottom finder line 28 running through hollow 103 to connect to trigger 104. The trigger 104 has a spring mechanism 106 and a pin 108. The pin 108 in the position shown fits in a recess 110 of a lockup pin 112. The lockup pin 112 is further held in place by a cotter pin 114. The cotter pin 114 is connected by line 116 to the line comprised of an aramid fiber mooring line 14 and sensor string 16. A suitable place is the junction between mooring line 14 and sensor string 16. The lockup pin 112 is operated by a spring 118. A restraining pin 120 limits the travel of lockup pin 112. The lockup pin 112 rests on a platform 122 that is held in place by screw 124. The top portion comprises a dome 125 held in place by screw 126. The dome 125 has an aperture 128 for cotter pin 114.

Prior to operation all components are in the position shown in FIG. 4. After the mooring device hits the water as previously described with reference to FIGS. 3a-i, the bottom finder 23 separates from anchor shell 12 paying out bottom finder line 28. In addition subsurface buoy 30 and surface float 50 separate from anchor shell 12 paying out mooring line 14 and sensor array 16. This causes the paying out of line 116 that is connected at one end of cotter pin 114 and at the other end to the junction between mooring line 14 and sensor string 16. Line 116 is not shown in FIGS. 3a-i. The sequence of operation is such that bottom finder line 28 is fully extended prior to mooring line extending far enough to cause line 116 to remove cotter pin 114. This extension of bottom finder line 28 insures tautness for the holding of lockup pin 112 in place by pin 108 after the extension of line 116 removes cotter pin 114 from recess 128.

The small weight 23 continues to fall pulling anchor shell 12 with it. Subsurface buoy 30 and surface float 50 remain atop the water with the line comprised of sensor array 16 and mooring line 14 continuing to pay out. When the small weight 23 hits bottom the pull on bottom finder line 28 slackens. This causes spring mechanism 106 to trigger 104 pulling pin 108 from recess 110. This in turn causes spring 118 to actuate lockup pin 112 causing it to move out from its enclosure into space 15 of FIG. 1, until it is limited in travel by restraining pin 120. The mooring line 14 which is paying out around lockup mechanism 18 has its rotation restrained by lockup pin 112 and after about four or five turns on lockup mechanism 18, the mooring line 14 binds tightly to lockup mechanism 26 preventing any more unraveling of mooring line 14.

Figure 3:
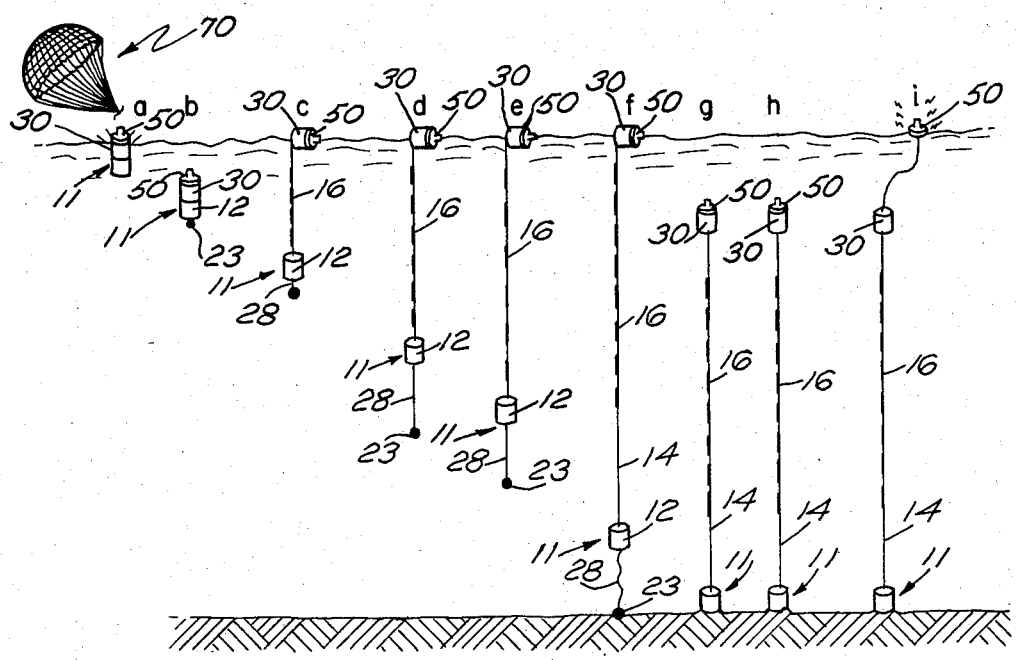
FIGS. 3a–i show the sea deployment of ADOM after the parachute is jettisoned.

At this time the system is substantially that of FIG. 3f with the small weight 23 on the bottom, the anchor shell 12 close to the length of bottom finder 29 away from the bottom and subsurface buoy 30 and surface float 50 at the surface of the water. The anchor shell 12 falls to the bottom as shown in FIG. 3g. This drags subsurface buoy 30 and surface float 50 down to a depth slightly less than that of bottom finder line 29. The surface float 50 then separates from subsurface buoy 30 and surface float 50 rises to the water surface with subsurface buoy 30 remaining in place.

There has therefore been described an Air Deployed Oceanographic Mooring having a surface buoy, a subsurface buoy located a predetermined distance below the water surface and an anchor located on the ocean bottom.

It will be understood that various changes in details, materials, steps and arrangement of parts, which have been herein described may be made by those skilled in the art within the principle and scope of the invention as expressed in the appended claims.

What is claimed is:

1. An air deployable oceanographic mooring system comprising:
    an anchor including a bottom finder, for suspension below part of said anchor during at least one phase of deployment, permanently attached to an anchor shell, by means of a first flexible line which is taut during said one phase, said anchor shell includes a second flexible line comprised of an aramid fiber mooring line connected to a sensor string, said anchor shell further includes a mooring line lockup mechanism connected to said first flexible line and said second flexible line, said mooring line lockup mechanism has means for inhibiting upon actuation the paying out of said second flexible line, said first flexible line prohibiting said actuation when taut;
    a subsurface buoy connected to said second flexible line, said subsurface buoy including a microprocessor enclosed in a housing and surrounded by syntactic foam;
    a surface float having a third flexible line attached to said subsurface buoy, said surface float including a transmitter and antenna enclosed in a housing and surrounded by syntactic foam with an embedded battery pack; and
    a parachute system attached to said surface float.

2. An air deployable oceanographic mooring system according to claim 1 further comprising:
    said bottom finder having a rigidly disposable affixment to said anchor shell;
    said anchor shell having a rigidly disposable affixment to said subsurface buoy;
    said subsurface buoy having a rigidly disposable affixment to said surface float; and
    said surface float having a rigidly disposable affixment to said parachute system.

3. An air deployable oceanographic mooring system according to claim 2 wherein all of said rigidly disposable affixments comprise explosive bolts.

4. An air deployable oceanographic mooring system according to claim 3 further comprising means for deploying said subsurface buoy a predetermined depth beneath the surface of the ocean upon deployment.

5. An air deployable oceanographic mooring system comprising:
    an anchor including a bottom finder permanently attached to an anchor shell, by means of a first flexible line, said anchor shell includes a second flexible line comprised of an aramid fiber mooring line connected to a sensor string, said anchor shell further includes a mooring line lockup mechanism connected to said first flexible line and said second flexible line, said mooring line lockup mechanism has means for inhibiting upon actuation the paying out of said second flexible line, said mooring line lockup mechanism further comprises a spindle having a chamber, and a first and second aperture, said first aperture extending from one end of said spindle to said chamber, and said second aperture being in the sidewall of said chamber, a spring actuated lockup pin located within said chamber and adapted to protrude through said chamber upon actuation, said lockup pin having an aperture and a slit, a trigger mechanism located within said chamber and having a trigger pin adapted to be inserted in said lockup pin aperture for inactivating said sping actuated lockup pin, said trigger mechanism further comprising a trigger spring on one side of a fulcrum adapted to remove by spring tension said trigger pin from said lockup pin and means on the other side of said fulcrum for applying tension to overcome the tension of said trigger spring, and a restraining pin for insertion in the locking pin slit for limiting the amount of travel of said spring actuated lockup pin;
    a subsurface buoy connected to said second flexible line, said subsurface buoy including a microprocessor enclosed in a housing and surrounded by syntactic foam;
    a surface float having a third flexible line attached to said subsurface buoy said surface float including a transmitter and antenna enclosed in a housing and surrounded by syntactic foam with an embedded battery pack; and
    a parachute system attached to said surface float.

* * * * *